United States Patent [19]
MacKinnon

[11] 3,750,627
[45] Aug. 7, 1973

[54] TURNING CONTROL SIGNAL

[75] Inventor: Allan A. MacKinnon, Gloucester, England

[73] Assignee: Associated Manufacturers International, S. A., Chicago, Ill.

[22] Filed: Nov. 5, 1971

[21] Appl. No.: 196,008

[52] U.S. Cl. ................................................ 119/44
[51] Int. Cl. ............................................ A01k 41/06
[58] Field of Search ..................... 119/35, 43, 44; 340/213, 213.1

[56] References Cited
UNITED STATES PATENTS
3,006,320  10/1961  Bailey ............................... 119/44 X
3,147,737  9/1964  Theilig ................................ 119/35

Primary Examiner—Russell R. Kinsey
Assistant Examiner—J. N. Eskovitz
Attorney—Wheeler, House & Wheeler

[57] ABSTRACT

Apparatus for signaling a malfunction in the turning motion of egg trays in an incubator. The apparatus includes an egg tray position sensor, an electric circuit and a signal. The turning motion of the tray directly affects the position of the sensor and directly triggers the signal.

7 Claims, 5 Drawing Figures

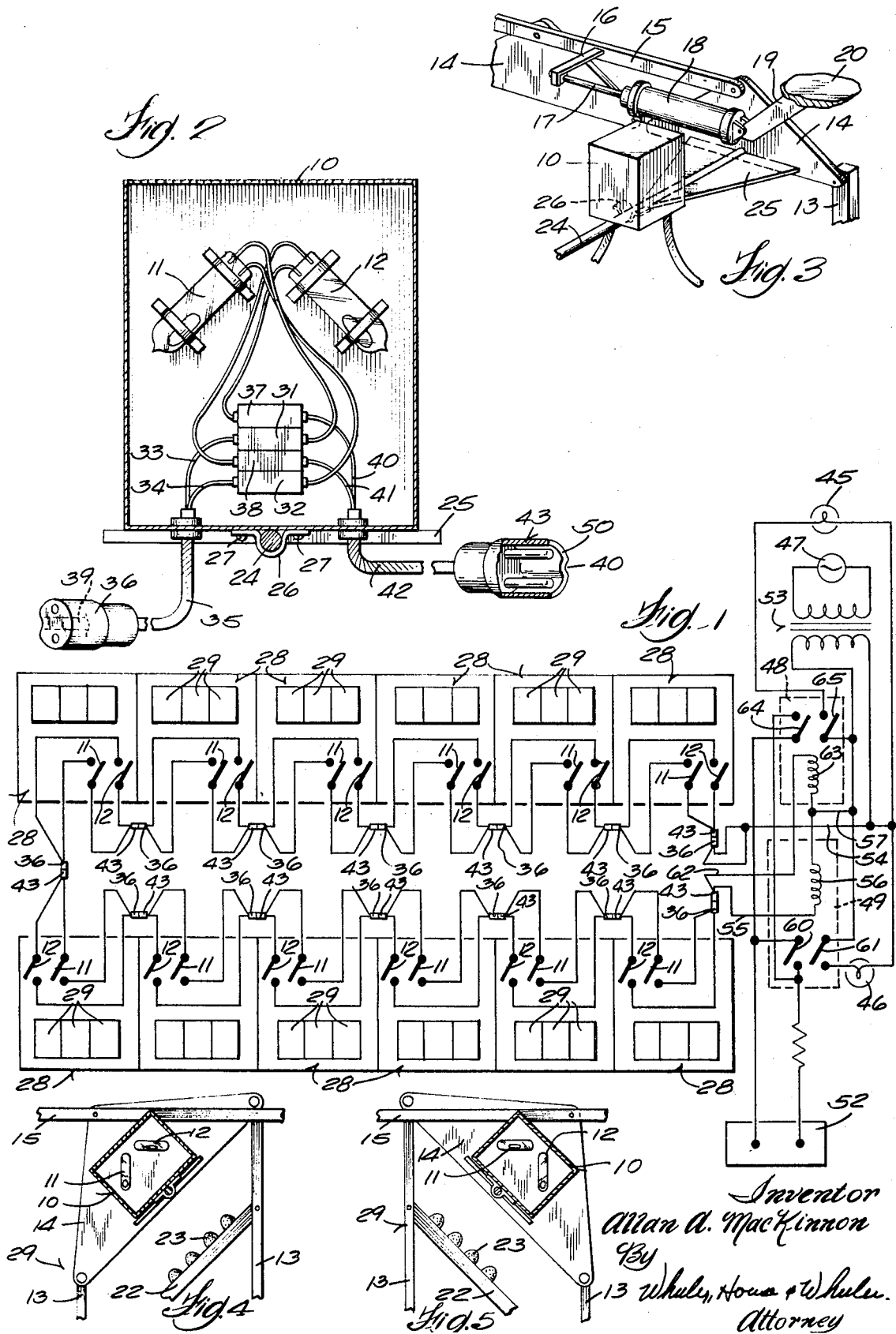

TURNING CONTROL SIGNAL

BACKGROUND OF THE INVENTION

Heretofore signal devices indicating incubator egg tray turning malfunctions have responded to apparatus not directly associated with the trays. Accordingly, false signals can be generated in the event of a malfunction between the apparatus which triggers the signal and the tray itself, thus rendering such devices somewhat unreliable.

SUMMARY OF THE INVENTION

In accordance with the present invention there is a position sensor directly associated with the egg tray or the mechanism which turns it. This sensor responds directly to turning motion of the tray and triggers the signal. Accordingly, there is a reliable and invariable indication of the position of the tray with no possibility of malfunction or loss of an indication in the event the tray does not turn.

In preferred embodiments each set of trays in an egg rack is provided with a pair of position sensor switches which are mutually mounted at an angle through which the trays are periodically turned. The respective switches are alternately actuated near the ends of the complete turning motion of the trays through said angle. All corresponding switches on the respective racks are connected in series. Each set of series connected switches separately triggers its signal to indicate the proper functioning of the turning mechanism and the ultimate position of the tray.

The sensing switches are easily attached by a simple clamp mechanism to the rotating rods which are incorporated in the turning mechanism for the trays of each rack. The respective sensing units of the respective trays have releasable couplings with corresponding sensing units on adjacent racks, thus to connect the corresponding sensing units of a series of racks in an incubator in series. Any rack may be readily connected and disconnected to permit independent movement of the racks in the course of loading and unloading them from the incubator.

Other objects, features, and advantages of the invention will appear from the following disclosure.

DESCRIPTION OF THE DRAWINGS

FIG. 1 is a circuit diagram for an incubator with a full load of egg racks, each having paired position sensing switches connected in series in the circuit.

FIG. 2 is a vertical cross section taken through one of the switch boxes which contains a set of paired sensing switches for one of the racks.

FIG. 3 is a fragmentary perspective view showing the manner of connecting the sensor box to one of the turning rods in a rack.

FIG. 4 is a diagrammatic view indicating the position of the sensing switches when the trays are turned in one direction.

FIG. 5 is a diagrammatic view similar to FIG. 4, but indicating the position of the switches when the trays are turned in the opposite direction.

DESCRIPTION OF THE PREFERRED EMBODIMENTS

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The present invention is specifically adapted for incorporation into or as an attachment to the incubator shown in U.S. Pat. No. 3,147,737 granted Sept. 8, 1964, although it can also be incorporated into or attached to turning trays of other incubators.

As is well known in this art, eggs in an incubator are periodically turned through an angle of about 90° once each hour. For one hour the eggs are inclined in one direction at a 45° angle to the horizontal, whereupon they are turned through 90° to incline at the opposite 45° angle, as is illustrated and described in the said U.S. Pat. No. 3,147,737.

In accordance with the present invention, the box 10 contains a tray position sensor which comprises a pair of mercury tube switches 11, 12. These are mounted with their respective axes intersecting at the same angle (approximately 90°) as the eggs are swung through in the course of turning motion aforesaid.

Details of the egg tray turning mechanism are shown in said U.S. Pat. No. 3,147,737 (see FIG. 10 in particular) and are repeated in less detail in FIG. 3 hereof. The trays 22 are mounted on vertical hanger rods 13, the top ends of which are pivotally interconnected by triangular rocker arms or plates 14 having their respective upper apices interconnected by a tie bar 15. A motor such as air cylinder 18 has its base pivotally mounted by bracket 19 to an incubator rack wall 20. Piston 17 connects with tie bar 15 through bracket 16. Mechanism not herein illustrated periodically energizes the air cylinder 18 to tilt the rocker arms 14, the trays 22 and contained eggs between the extreme positions illustrated in FIGS. 4 and 5. In FIG. 4 egg tray 22 has its eggs 23 inclined at a 45° angle to the hozizontal. In FIG. 5 the tray 22 has its eggs 23 inclined at an opposite 45° angle.

Position sensor box 10 can be physically attached to any of the mechanism which moves directly with the egg tray 22, thus to transmit such motion directly to the position sensing switches 11, 12 in the box 10. In the illustrated embodiment each rocker arm 14 is provided with a rock shaft or rod 24, the same being re-enforced in rigid connection with the rocker arm 14 by a gusset plate 25.

The bottom of box 10 is provided with a pipe strap 26 with adjustable fastener bolts 27 by which the strap 26 is clamped to the rod 24. Accordingly, box 10 will swing in unison with the rod 24. To insure against any dislocation in the position of the box 10 with respect to rod 24, the box 10 is desirably positioned in overlapped relationship with the gusset plate 25, as illustrated in FIGS. 2 and 3, thus to interlock the box and the rod for concurrent motion.

Egg tray racks 28 are periodically wheeled into and out of the incubator as described in said U.S. Pat. No. 3,147,737. Each rack contains three columns 29 of stacked egg trays. FIG. 1 illustrates these schematically. All of the trayed eggs in each column 29 in any one rack move together. The circuit and physical connections of the electric parts as illustrated in the drawings provide for easy connection and disconnection of the sensors of each rack as they are added to and removed from the circuit.

In the preferred embodiment the set of position sensing switches 11, 12 comprise of plug tube switches, although other position sensing switches could be substituted therefor. The leads from mercury tube switch 11 are respectively connected to terminal blocks 31, 32, leads 33, 34 therefrom extending through a dual conductor cable 35 to a dual conductor socket 36. The leads from mercury tube switch 12 extend to terminal blocks 37, 38. Leads 40, 41 extend therefrom through a two-conductor cable 42, terminating in a pronged plug 43. Each sensor set 10 for each rack 28 is similarly arranged. The respective plugs 43 and sockets 36 are provided with a conventional polarizing or non-reversible guide mechanism to insure continuity of the interconnection of all switches 11 and 12 respectively. For example, socket 36 can be provided with a side groove 39 which interfits with side rib 40 on the shell 50 of plug 43, thus to key the coupling together in polarized relation.

When the incubator is entirely full of eggs, the sensors 10 in racks 28 are interconnected as illustrated in FIG. 1. All of the mercury tube position sensing switches 11 are in series and all of the mercury tube position sensing switches 12 are in series. Two signal lamps, respectively 45 (red) and 46 (white), are provided in a circuit energized from source 47. Double-pole single-throw relays 48, 49 are also provided, inorder to concurrently energize the appropriate lamps 45, 46 and an optional recording clock 52.

In operation the incubator is set up as illustrated in FIG. 1. When the turning control mechanism (not shown) is energized to concurrently actuate the air cylinders 18 on all of the racks, thus to turn the trays 22 to one inclined position shown in FIG. 4, all of the mercury position sensing switches 12 will be closed, as illustrated in FIG. 4, and all of the mercury sensing switches 11 will be open, as is also illustrated in FIG. 4. Thus all of the series connected closed switches 12 will complete a circuit from source 47 through an appropriate transformer 53 through common lead 54, the closed series connected switches 12, lead 55, the coil 56 of relay 49 and back through lead 57 to source transformer 53. Energization of coil 56 of relay 49 will cause the contacts 60, 61 in relay 49 to close, thus completing a circuit from transformer 53 through contact 61 to lamp 46 (white), thus lighting up this lamp. Contact 60 closes a circuit to the recording clock 52 which has a separate source of voltage.

Meanwhile, inasmuch as all of the switches 11 are now open, the circuit to lamp 45 (red) will be open, and this lamp will remain extinguished. The illumination of lamp 46 signals the operator that in fact all of the egg trays 22 in the incubator have been properly turned to their inclined 45° angle position shown in FIG. 4. If white light 46 does not light up the operator knows that one or more of the switches 12 is open and hence there has been a malfunction in the turning mechanism and that at least one tray is in an improper position. The operator will then inspect the racks to determine which rack has not turned and will take remedial action.

When the next turning motion is induced by actuation of air cylinders 18 to turn the racks to their FIG. 5 position, switches 12 will all open, thus extinguishing lamp 46. If there is no malfunction, all of the series connected switches 11 will close, thus to complete a circuit to the red lamp 45, through lead 54, all of the closed series switches 11, lead 62, coil 63 in relay 48 and back through lead 57 to the transformer 53. Energization of coil 63 will close the contacts 64, 65 in relay 48, thus to concurrently energize red lamp 45 and the recording clock 52. Any malfunction in the turning of the trays to the FIG. 5 position will be sensed by an open switch 11, thus failing to light lamp 45 and signaling the operator to correct the malfunction.

It is advantageous that the lamps 45, 46 are alternately illuminated to indicate a correctly turned position of the trays, as distinguished from leaving the respective lamps unlit, to so indicate.

Periodically, the racks 28 paired at opposite sides of incubator aisle 44 at the late stage end of the incubator will be removed and all racks will be shifted in the direction of the removed racks to leave room for a pair of early stage egg racks to be moved into the incubator at the other ends of the rows, as explained in U.S. Pat. No. 3,147,737. The end racks 28 at both ends of each row are disconnected from the circuit by uncoupling the appropriate plugs 36 and sockets 43, thus to permit independent handling of the racks 28. When new racks with early stage eggs are in position, the appropriate plugs 36 and sockets 43 are coupled at both ends of both rows to again complete the electrical circuit as illustrated in FIG. 1.

The mercury tube switches 11, 12 will typically close when horizontal, or nearly so. At any other position the switch will open. Accordingly, the switches 11, 12 will close near the extreme ends of the turning motion of the trays, as is respectively illustrated in FIGS. 4 and 5.

I claim:

1. In an incubator having an egg tray which is periodically turned and mechanism for turning said tray, the improvement to signal and improper tray position caused by a turning malfunction and comprising an electric circuit including a position sensor, means mounting said sensor to respond to the improper position of said tray, and signal means triggered by said sensor in direct response to the improper position of the tray.

2. The invention of claim 1 in which said mechanism turns said tray through an angle, said position sensor comprising a pair of sensor switches mutually mounted at said angle whereby the switches are alternately actuated near the ends of the turning motion of the tray through said angle, separate signals being actuated by each said switch to separately indicate the position of the tray.

3. The invention of claim 1 in which said incubator has a plurality of separate racks having egg trays which are all turned substantially concurrently, each rack having at least one position sensor responding to the turning of the trays therein, a circuit connecting the sensors in each rack in series with said signal whereby all sensors must respond in order to trigger the signal.

4. The invention of claim 3 in which said circuit has releasable couplings between each rack, to enable the racks to be individually disconnected from the circuit in the course of moving them into and out of the incubator.

5. The invention of claim 1 in which the mechanism for turning said trays comprises a rod, said sensor being provided with means releasably clamping it to the rod to move therewith.

6. The invention of claim 5 in which said mechanism further comprises a gusset plate, a box for said sensor, said plate and box being interlocked by said means to insure concurrent movement of the box and sensor in response to rod movement.

7. The invention of claim 2 in which said switch comprises mercury tubes which make contact in one position and which break contact in other positions.

* * * * *